UNITED STATES PATENT OFFICE.

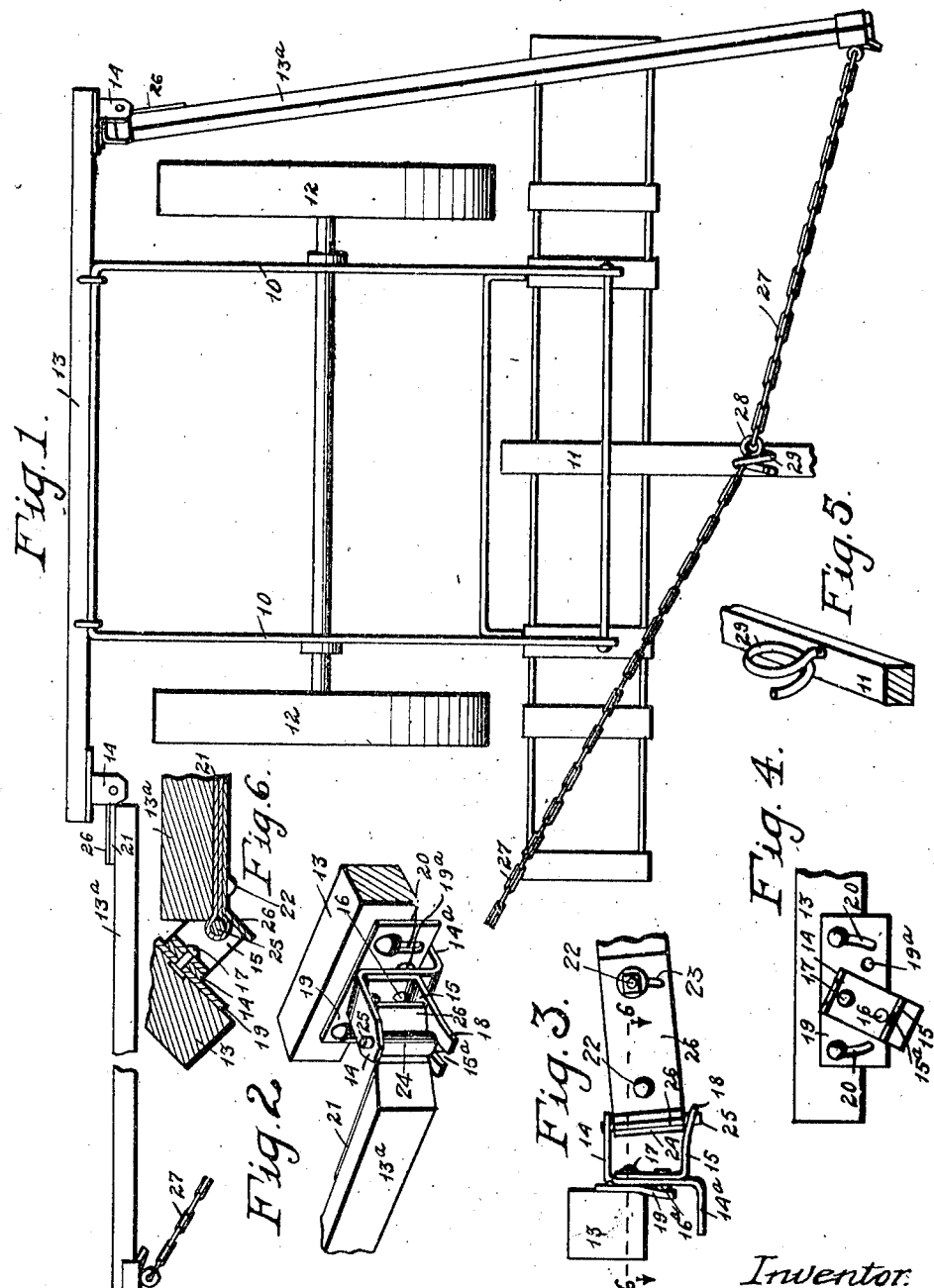

LEROY J. LINDSAY, OF SEYMOUR, IOWA.

MARKER FOR CORN-PLANTERS.

1,040,364. Specification of Letters Patent. Patented Oct. 8, 1912.

Application filed July 19, 1911. Serial No. 639,352.

*To all whom it may concern:*

Be it known that I, LEROY J. LINDSAY, a citizen of the United States, residing at Seymour, in the county of Wayne and State of Iowa, have invented a certain new and useful Marker for Corn-Planters, of which the following is a specification.

My invention relates to that class of markers illustrated in Patent No. 953,849, issued to me on April 5, 1910, and which is characterized by having a cross piece rigidly fixed to the rear of the planter frame, which cross piece supports two marker arms, each having an independent movement relative to the cross piece and said marker arms being connected at their outer ends by a flexible chain running through a suitable guide at the front of the planter whereby one marker arm is held by engagement with the ground to position substantially at right angles to the line on which the planter is advancing and the other marker arm is held by the chain in an elevated position substantially parallel with the line on which the planter is advancing, said parts being so arranged that when the planter is turned around at the end of a row the marker arms will automatically reverse their positions without attention on the part of the operator.

The object of my present invention is to provide a simple, durable and inexpensive means for detachably connecting the marker arms with the cross piece, which detachable connection is so arranged that the marker arms can be detached only when moved to a position substantially parallel with a fore-and-aft line through the planter and they cannot be detached when in any of the positions which they assume when in use; and further to provide a detachable connection of this kind in which the marker arm may be attached or detached quickly and easily and without the use of tools.

A further object is to provide improved means for limiting the movement of the bracket that is attached to the cross piece and that supports the marker arm; and also to provide a sliding and detachable support for the chain and the marker arms at the forward end of the planter.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a top or plan view of a corn planter having my improvement applied thereto. Fig. 2 shows a perspective view of a part of one of the marker arms and the bracket to which it is connected showing the detachable connection between the marker arm and the bracket. Fig. 3 shows an end elevation of the cross piece of the planter frame and my improved detachable connection for the marker arm, said marker arm being shown in position for being detached from the cross piece. Fig. 4 shows a front view of one end of the cross piece with part of the connecting device thereon. Fig. 5 shows a detail, perspective view illustrating the sliding detachable chain connecting device, and Fig. 6 shows a sectional view of the cross piece and marker arm taken on the line 6—6 of Fig. 3.

Referring to the accompanying drawing, I have used the reference numeral 10 to indicate a planter frame having a tongue 11 and supporting wheels 12. Fixed to the rear of the frame 10 is a cross piece 13 with its ends extending beyond the wheels. On each end of said cross piece is a bracket and a marker arm 13ª.

The bracket consists of a substantially U-shaped body portion preferably constructed of two pieces, the portion 14 of the bracket forming the upper side thereof being bent downwardly and then in a direction under the cross piece 13, thus forming an arm 14ª. The lower member 15 of the bracket is bent upwardly adjacent to the downwardly extending portion of the member 14 and the two are fixed together by means of two bolts 16 and 17. The bottom portion 15 of the bracket is provided with a slot 15ª and the part of said bottom portion adjacent to the slot is preferably beveled or tapered downwardly at 18.

An adjustable plate is provided for the side of the cross piece adjacent to the bracket comprising a flat metal plate 19 having transverse slots 20 therein. A bolt is inserted into each of said slots and then into the cross piece 13, thereby making the plate 19 adjustable relative to said cross piece. The bracket is connected to said plate 19 by means of the bolt 17 above referred to, and is capable of pivotal movement thereon, said pivotal movement being limited by reason of the arm 14ᵃ coming in contact with the lower edge of the plate 19.

In order that the marker arm may swing at the proper angle to insure its automatic operation, I have provided the bolt 16 with a rounded head 16ᵃ, said head being adjacent to the plate 19. The plate 19 is provided with an opening 19ᵃ to receive said rounded head. When the marker arm is in its operative position, as shown in Fig. 2, the rounded head 16ᵃ of the bolt will be a considerable distance from the opening 19ᵃ, but when the marker arm is being moved to its inoperative position the weight on the outer end of said arm will cause the bracket to turn on its pivotal point and operate to slide the rounded head 16ᵃ across the surface of the plate 19 until said head reaches the opening 19ᵃ where it will be yieldingly held therein. The marker arm will then swing upwardly and inwardly at such an angle as to pass over the outwardly extended portion of the planter frame. Furthermore, the marker arm will be held in this position and when the tension on the chain is released the angle at which said marker arm is supported will be such that gravity will cause said arm to swing downwardly and outwardly to a point on the ground surface midway between the operative and inoperative positions of the marker arm. Then as the planter is advanced the marker arm will resume its position at right angles to the line of advancement and the bracket will therefore turn on its pivotal point to the position shown in Fig. 2, thus moving the rounded head 16ᵃ of the bolt out of engagement with the opening. The bolt being thus out of engagement with the opening 19ᵃ, the marker arm will be free to move up and down to conform with the irregularities of the ground surface over which it passes.

On account of the plate 19 being slotted, as shown in Fig. 4, it is obvious that the angle at which the marker arm swings may be regulated to suit the requirements by changing the angle of the plate 19 with relation to the cross piece 13.

Attached to the inner end of the marker arm is a metal plate 21 connected with the marker arm by two bolts 22, the outer one of which passes through a slot 23 in the plate 21 so that the marker arm may be adjusted relative to the plate 21. At the inner end of the plate 21 is a tubular bearing 24 through which an upright journal 25 is extended and on the inner end of the marker arm, adjacent to the tubular bearing 24, is a locking plate 26 extended at approximately right angles to the marker arm. This plate is of such size and shape and is so positioned relative to the marker arm that so long as the marker arm is substantially parallel with the cross piece or in any position of its movement between said position parallel with the cross piece and at its forward limit of movement, as shown in Fig. 2, the locking plate 26 will engage the lower portion 15 of the U-shaped bracket and thus prevent the journal 25 from moving out of the slot 15ᵃ. However when the marker arm is moved to position substantially at right angles to the cross piece then the said locking plate will not engage the U-shaped frame and the journal 25 may be detached from the U-shaped bracket by moving the lower end of the journal forwardly through the slot 15ᵃ and then after the marker arm is clear of the U-shaped bracket the upper end of the bracket may be detached by moving it straight downwardly through the opening in the upper portion of the U-shaped bracket. However so long as the locking plate is in engagement with the bottom of the U-shaped bracket at a point in the rear of the slot 15ᵃ, said U-shaped plate prevents the lower end of the journal from becoming detached from the bracket. In detaching the marker arm from the bracket the forward end of the marker arm is tilted upwardly.

The forward ends of the marker arms are connected by a flexible chain 27 and this flexible chain is provided with limiting stops 28. Fixed to the tongue 11 is a sliding and detachable support for said chain consisting of a rod 29 having one end fixed to the tongue and having its body portion formed in spiral shape, said spiral consisting of slightly more than one complete circle. The chain may be attached to the spiral support without being extended endwise through it. This may be done by simply placing the chain between the end of the spiral support and the adjacent part of the body thereof and then moving the chain within the spiral support through about one half of a revolution, whereupon the chain will be extended through the circular part of the body portion of the spiral support and it may slide freely through the sliding support without danger of becoming detached from it, as said detachment can only be made by the operator removing the chain from the support in a reverse manner from that in which it was attached as before described.

In practical operation, it is obvious that my improved marker works in the same manner as my previous invention in the patent before referred to. However if for any reason it becomes desirable to detach the marker arms and chain from the planter this may be readily, quickly and easily done without the use of tools by first moving each marker arm to position extended straight forwardly and then tilting its outer end upwardly, thus permitting the locking plate to clear the forward end of the lower portion of the U-shaped bracket. Then the chain may be detached from the support at the end of the tongue and the chain may be rolled up upon the marker arms and the marker arms may be laid aside or carried on the frame in position where they will not interfere with the operation of the planter.

I claim as my invention:

1. In a device of the class described, the combination of a frame, a bracket pivoted to the frame, and a marker arm pivoted to the bracket and capable of detachment from the bracket when in a certain position of its movement relative to the bracket, and means for holding the marker arm from detachment with the bracket when in any other positions of its movement.

2. In a device of the class described, the combination of a frame, a bracket pivoted to the frame, a marker arm pivotally connected to the bracket, and a locking means designed to prevent detachment of the marker arm from the bracket when the marker arm is in certain positions of its movement and also designed to permit detachment of the marker arm from the bracket when the marker arm is in another position of its movement.

3. In a device of the class described, the combination of a frame, a substantially U-shaped bracket pivoted to the frame and having an opening at its upper portion and a slot at its lower portion, a marker arm, a journal carried thereby and designed to enter said opening and slot, and a locking plate fixed to the marker arm to engage the U-shaped bracket, for the purposes stated.

4. In a device of the class described, the combination of a frame, a substantially U-shaped bracket pivoted to the frame and having an opening at its upper portion, and a slot at its lower portion, a marker arm, a journal carried thereby and designed to enter said opening and slot, the lower portion of the U-shaped bracket being inclined downwardly and forwardly adjacent to the slot, and a locking plate fixed to the marker arm to engage the U-shaped bracket, for the purposes stated.

5. In a device of the class described, the combination of a cross piece, a bracket pivotally connected to the cross piece and designed to move in a vertical plane, a marker arm pivoted to the bracket, and means for adjustably limiting the pivotal movement of the bracket.

6. In a device of the class described, the combination of a cross piece, a bracket pivotally connected to the cross piece, a marker arm pivoted to the bracket, and means for adjustably limiting the pivotal movement of the bracket, said means comprising a plate adjustably mounted on said cross piece and having an opening therein, and a bolt fixed to said bracket having a rounded head to enter said opening.

7. In a device of the class described, the combination of a cross piece, a plate having an opening therein adjustably mounted on said cross piece, a bracket pivotally connected to said plate, a marker arm pivoted to said bracket, and a bolt in said bracket having a rounded head adjacent to said plate, said head being designed to enter the opening in said plate for the purpose of fixing the angle at which said marker arm swings from operative to inoperative position and to allow said marker arm to return to operative position by gravity, substantially as described.

Des Moines, Iowa, July 8, 1911.

LEROY J. LINDSAY.

Witnesses:
J. S. McCord,
J. H. Moore.